United States Patent [19]

Woodrich

[11] Patent Number: 4,846,914

[45] Date of Patent: Jul. 11, 1989

[54] FORMING SYSTEM FOR THERMOFORMABLE PARTS WITH FLEXIBLE WEB COVERSTOCK

[75] Inventor: Kenneth H. Woodrich, Rochester, Mich.

[73] Assignee: Ford Motor Company, Dearborn, Mich.

[21] Appl. No.: 52,679

[22] Filed: May 21, 1987

[51] Int. Cl.$^4$ .................. B29C 31/08; B29C 31/10; B29B 13/02

[52] U.S. Cl. .................. 156/243; 156/245; 156/309.9; 156/322; 156/552; 156/324; 156/250; 264/544; 264/553

[58] Field of Search ............... 156/243, 245, 552, 519, 156/322, 164, 324, 309.9, 250; 264/544, 553

[56] References Cited

U.S. PATENT DOCUMENTS

| | | |
|---|---|---|
| 255,798 | 4/1882 | Leake . |
| 520,294 | 5/1894 | Boch . |
| 1,376,737 | 5/1921 | Tscheike . |
| 2,782,458 | 2/1957 | Emmert et al. .................. 156/496 X |
| 3,068,138 | 12/1962 | Friedman . |
| 3,396,062 | 8/1968 | White .................. 264/544 X |
| 3,697,369 | 10/1972 | Amberg et al. .................. 156/322 X |
| 3,738,888 | 6/1973 | Williams . |
| 3,765,976 | 10/1973 | Nasica . |
| 3,814,658 | 6/1974 | Decker .................. 156/245 X |
| 3,935,047 | 1/1976 | Shinomura . |
| 3,962,018 | 6/1976 | Costemalle et al. . |
| 3,971,688 | 7/1976 | Abbott . |
| 3,995,984 | 12/1976 | Fetherston et al. . |
| 4,036,675 | 7/1977 | Amberg et al. .................. 156/322 X |
| 4,044,188 | 8/1977 | Segal . |
| 4,128,682 | 12/1978 | Normura et al. . |
| 4,146,418 | 3/1979 | Walter .................. 156/245 |
| 4,228,116 | 10/1980 | Colombo et al. . |
| 4,243,456 | 1/1981 | Cesaro . |
| 4,258,093 | 3/1981 | Benedyk . |
| 4,302,269 | 11/1981 | Steinberg et al. . |
| 4,314,867 | 2/1982 | Berger .................. 156/322 X |
| 4,445,954 | 5/1984 | Adams et al. . |

*Primary Examiner*—Michael W. Ball
*Assistant Examiner*—Jeff H. Aftergut
*Attorney, Agent, or Firm*—Peter D. McDermott; Roger L. May

[57] ABSTRACT

The present invention is directed to a method of manufacturing a thermoformed, form-retaining article comprising a form-retaining thermoformable substrate and a flexible web coverstock. The method comprises feeding a continuous strip of the flexible web coverstock through a thermoforming line comprising at least a lamination station, a thermoforming station and transport means. Sheets of the substrate are fed into the lamination station and there laminated to said continuous strip of coverstock material. The coverstock is wider than the substrate sheetstock laminated thereto, and thus, it extends laterally beyond the sheetstock, i.e., it has free longitudinal edges. The transport means engages the continuous strip of coverstock material along the free longitudinal edges thereof. The transport means is actuated to advance the continuous strip and, hence, each successive piece of substrate laminated thereto from the lamination station into the thermoforming station. The thermoforming line optionally comprises additional stations, such as ornamentation stations, trim stations, and the like. Additional material may be included in the lamination such as, for example, padding-type materials between the coverstock and the substrate, an additional sheet of coverstock on the opposite side of the substrate sheetstock, and the like.

13 Claims, No Drawings

FORMING SYSTEM FOR THERMOFORMABLE PARTS WITH FLEXIBLE WEB COVERSTOCK

BACKGROUND OF THE INVENTION

This invention is directed to a method for the manufacture of thermoformed articles comprising a form-retaining thermoformable substrate and a flexible web coverstock. More specifically, the invention is directed to a process and apparatus in which multiple steps are performed in a single, integrated process.

It has long been known to manufacture form-retaining parts from sheets of thermoformable material. Exemplary of such technology is that disclosed in U.S. Pat. No. 4,243,456 to Cesano. Therein is taught the use of, for example, thermoformable sheets comprising polyolefin and woodflour. Such sheets can be produced by the extrusion method disclosed in U.S. Pat. No. 4,228,116 to Columbo et al. Numerous additional thermoformable sheetstocks comprising thermoplastic materials are well known to the skilled of the art and are commercially available. Amongst the many thermosettable sheetstock materials are fiber reinforced sheet molding compound (SMC) and the like.

Various different thermoforming processes are known to the skilled of the art and include, for example, compression molding and the like. A choice of appropriate thermoforming processes will depend, in part, on the nature of the thermoformable sheetstock employed and on the configuration and desired properties of the finished product.

Frequently it is desirable to provide the thermoformed product with a coverstock material. The coverstock material may be, for example, a woven or non-woven fibrous material laminated to a surface of the thermoformed product for decorative and/or functional purposes. Other coverstock materials include, for example, a plastic sheet laminated to a surface of the thermoformed product, again for decorative purposes and/or for functional purposes, such as moisture or abrasion protection. Such coverstock materials can be laminated to the theroformable substrate sheetstock either prior to the thermoforming step or, more typically, during the thermoforming step. Thus, for example, in a typical thermoforming process a sheet of thermoformable material is positioned in a molding tool, such as by laying it over the lower member of a pair of matched forming dies, and subsequently a sheet of the coverstock material is positioned on top of the thermoformable sheetstock. In this way the sheetstock is thermoformed into the desired product configuration and the coverstock is laminated thereto in a single step. Alternatively, the coverstock can be laminated to the sheetstock prior to the thermoforming step. While this simplifies and reduces the labor of the thermoforming step, there may be an even greater, offsetting increase in the labor associated with the separate lamination step if that involves loading and positioning the substrate sheetstock and coverstock together in a laminating device. In some instances, however, it is possible to laminate the coverstock to the substrate sheetstock during manufacture of the substrate sheetstock with considerable efficiencies in time and labor. Even in this case though, there remains the labor and time requirements associated with the thermoforming step, plus that associated with removing the thermoformed product from the thermoforming mold and transporting it to any one or more subsequent stations, such as trimming stations at which excess material is trimmed away, parting lines and apertures are cut into the part, etc.

It is an object of the present invention to provide a process and apparatus which enable an improvement in the labor and cost efficiencies associated with thermoforming form-retaining products comprising a thermoformable substrate and a flexible web coverstock laminated thereto. These and other advantages and features of the invention will be better understood from the following disclosure.

SUMMARY OF THE INVENTION

According to the invention, a method is provided of manufacturing a thermoformed form-retaining article, a laminate comprising a thermoformable form-retaining substrate and a flexible web coverstock, such method comprising:

(A) feeding a first location of a continuous strip of such flexible web coverstock to a lamination station, the continuous strip being engaged along at least selected portions of each longitudinal edge by transport means for advancing the continuous strip longitudinally forward;

(B) feeding a first thermoformable sheet of the aforesaid thermoformable substrate onto a support surface of the lamination station and positioning it beneath the aforesaid first location of the continuous strip of coverstock, the continuous strip being laterally wider than the thermoformable sheet by at least the width of the longitudinal edges engaged by the transport means, steps (A) and (B) being performed in any sequence;

(C) actuating the lamination station to press the thermoformable sheet into contact with the first location of the continuous strip of coverstock to laminate them together;

(D) subsequently actuating the aforesaid transport means to advance the continuous strip longitudinally forward to transport the first location of the continuous strip of coverstock and the thermoformable sheet laminated thereto from the lamination station to a thermoforming station and to advance a second location of the continuous strip of coverstock to the lamination station;

(E) feeding a second sheet of thermoformable substrate onto the support surface of the lamination station and positioning it beneath the second location of the continuous strip of coverstock;

(F) actuating the thermoforming station to thermoform the first thermoformable sheet, the first location of the continuous strip of coverstock remaining laminated thereto, steps (E) and (F) being performed after step (D) in any sequence;

(G) activating the lamination station to press the aforesaid second thermoformable sheet into contact with the aforesaid second location of the continuous strip of coverstock to laminate them together, steps (F) and (G) being performed in any sequence, step (G) being performed subsequent to step (E); and (H) thereafter again actuating the transport means to advance the continuous strip of coverstock longitudinally forward.

As will be apparent to the skilled of the art in view of the present disclosure, the process of this invention can be performed on a continuous repeat basis. Also, as discussed more fully below, additional steps can be added to the process before the lamination step, between the lamination step and the thermoforming step and/or following the thermoforming step. With or without such additional steps, it will be apparent to the skilled of the art from this disclosure that a critical feature of the invention is to provide the coverstock material to be incorporated in the final thermoformed laminate as a continuous strip of material to which individual sheets of the thermoformable substrate is laminated at spaced locations, following which the continuous strip of coverstock material is used as a transport vehicle to carry the substrate sheetstock to a next station in the thermoforming line. The flexible continuous strip of coverstock material is provided in a width greater than that of the substrate sheetstock such that following the lamination step there is a free edge of coverstock material which is or can be gripped or otherwise engaged by the transport means. Actuation of the transport means then advances the continuous strip of coverstock material longitudinally forward a predetermined distance. It will be appreciated by the skilled of the art in view of this disclosure that following the lamination step the position of the substrate relative the coverstock is fixed. It will, accordingly, be within the skill of the art to monitor and control the position of the continuous strip, whereby the substrate material can be precisely positioned substantially free of hand labor in each subsequent process step. In short, the present invention provides the automatic transfer of a substrate/coverstock laminate through a thermoforming line. Accordingly, substantial cost and labor efficiencies are achieved. More specifically, it will be recognized in view of this disclosure that this feature of the invention, the ability to monitor and maintain the precise location of the substrate sheetstock from one forming line station to the next, means that smaller sheets of substrate sheetstock can be used. This follows from the fact that less margin of error is required in selecting the dimension of the sheetstock. Since it will be more precisely positioned within a forming line station, the peripheral area of the sheet beyond that actually required for the thermoformed product can be reduced. This leads advantageously to a reduction in sheetstock cost and to a reduction in energy usage since there is less sheetstock material to transport, heat, etc. Additional features and advantages of the invention are further discussed below.

DETAILED DESCRIPTION OF THE INVENTION

The process of this invention is suited to the forming of form-retaining products, whether structural, semi-structural or non-structural, wherein a thermoformable substrate is to be thermoformed with a flexible web coverstock material laminated thereto. The process is particularly well suited to the manufacturing of such products in which the substrate comprises primarily polyolefin and woodflour according to the Columbo et al and Cesano patents referred to above, the disclosures of which are incorporated herein by reference, and the coverstock comprises a nonwoven thermoplastic fibrous material. The following detailed discussion of the invention will be directed to a process employing these materials, but it will be understood to the skilled of the art in view of this disclosure that many known thermoformable sheetstock materials can be substituted for the polyolefin/woodflour sheetstock (commonly referred to as "woodstock") and that many known alternative coverstock materials can be substituted for the nonwoven thermoplastic et al fibrous coverstock material.

According to a preferred embodiment of the invention, the lamination station and thermoforming stations (and other stations, if any, in the forming line as further discussed below) are arranged in a substantially straight line such that the output of one station is properly oriented for input to the next station. The continuous strip of flexible coverstock material preferably is fed from a large roll thereof located at the lamination station end of the line. Thus, the coverstock material is fed from such roll to the input of the lamination station, through the lamination station to the input of the next station, and so on. The coverstock must have sufficient tensile strength and flexibility to carry the substrate sheetstock laminated thereto from station to station, including such stresses as will occur during the lamination step, forming step, etc.

The coverstock is laminated to the substrate sheetstock in the lamination station by any suitable means including, for example, the use of adhesive and/or the use of thermal bonding. To facilitate the lamination either the coverstock, the substrate sheetstock or both may carry a layer of adhesive, such as pressure sensitive, heat activated, or other suitable type. According to the preferred embodiment, the coverstock and substrate sheetstock are thermally laminated to each other. Thus, either the coverstock material or the substrate or both are heated prior to and/or during the lamination step. Numerous suitable means for heating the materials will be apparent to the skilled of the art and include, for example, radiant heating and conduction heating. Where the coverstock material is intended to provide a cloth-like decorative surface in the finished product, it is preferable to pre-heat the substrate sheetstock and not the coverstock material, since pre-heating the fibrous coverstock may cause it to have diminished loft. Either the coverstock or the substrate sheetstock can be pre-heated prior to entering the lamination station and/or in the lamination station. According to one most preferred embodiment, a substrate sheetstock is radiantly pre-heated prior to being fed onto the support surface of the lamination station and, in addition, such support surface provides additional heating. Within the lamination station the coverstock and the substrate sheetstock are pressed into contact and laminated together. The support surface of the lamination station preferably is up-acting, such that the substrate sheetstock is raised into contact with the coverstock and an upper support surface is provided above the coverstock such that the coverstock and substrate sheetstock are sandwich between the two support surfaces. The additional heating within the lamination station preferably is provided by heating the support surface. Additional suitable arrangements for carrying out the lamination step will be apparent to the skilled of the art in view of the present disclosure.

Regarding heating, one preferred embodiment of the invention employs conductive heating of the nonwoven coverstock material and substrate sheetstock sandwiched together between an upper surface and an up-acting lower support surface (heating platens) in the lamination station to a temperature of approximately 200° F. The substrate sheetstock then is transferred on the lower heating platen to a radiant heating oven (i.e., the support surface of the lamination station shuttles to an oven) where the substrate sheet is further heated to approximately 340° F. The heated sheet is then transferred back to the lamination station, still supported on the lower heating platen of the lamination station, and the upper and lower heating platens are closed, thus laminating the coverstock to the substrate sheetstock.

Preferably a trolley mechanism is provided to transport the lower heating platen from the pre-heat/laminating station to the radiant oven for additional heating. According to one suitable design, the trolley can be mounted on slide rods which extend from under the laminating station to under the radiant ovens. Reflective heat shields can be used to protect the slide rods and other components of the trolley mechanism, as needed. In addition, an index mechanism is required to index the trolley from the laminating station to the radiant oven, which index mechanism would be coordinated according to known methods to the actuation of the transport means and stations of the forming line. The trolley index mechanism must be capable of positioning the trolley within a sufficiently small range of error to maintain the proper position of the (pre-heated) substrate sheetstock relative the coverstock in the lamination station. According to this preferred embodiment, the trolley index mechanism preferably positions the trolley within ±1/8". As would be known to the skilled of the art, stops may be used as an aid to positioning.

Preferably the oven support structure allows the radiant oven to be moved in and out of position independently of the rest of the forming line. It should, however, be capable of being firmly locked into position to prevent movement during operation of the forming line.

According to this preferred embodiment, the weight of the upper heating platen provides the pre-heating and laminating force. That is, the up-acting lower support surface lifts the upper platen with the coverstock and substrate sandwiched between them. It will be apparent to the skilled of the art that whether the upper platen is closed on the lower or visa versa, there must be substantial parallelism between the surfaces of the platens. It has been found that, typically, a highly accurate guidance means is not required on either platen and that "Thompson"-type bearings are sufficient and preferred. Preferably, when the lower platen is fully lifted, having lifted the upper platen, the upper platen is still in a free-hanging position. This reduces the structural requirements of the upper platen support structure. Depending on the material being thermoformed, it may be desirable that the heating platens be coated with a low-friction, low-stick material, such as polytetrafluoroethylene, to reduce adhesion of the coverstock and/or substrate sheetstock thereto. Temperature control of the heating platens can be provided by any numerous means known to the skilled of the art, for example, by means of thermocouples buried in the heating platens.

The substrate sheetstock can be fed or loaded into the lamination station either by hand or by automatic conveyor means. According to a preferred embodiment of the invention, multiple sheets of the substrate sheetstock are stacked on a support platform of a loading station and there adjusted into proper position, either by hand or automatically. The top sheet is conveyed from there by automatic conveyor means to a pre-heating station, as further discussed below. The pre-heated sheet is then automatically conveyed to the support surface of the lamination station. The automatic conveyor means in each case is indexed to the proper position for the substrate sheet on the support surface of the lamination station. Thus, after first being properly positioned on the support platform of the loading station, it is automatically conveyed to the proper location within the lamination station. Thereafter, being laminated to the coverstock, the sheetstock will not move either longitudinally or laterally relative the coverstock. It will be laminated to the proper location on the continuous strip of coverstock material and, as discussed above, will thereafter be carried forward by the coverstock material from station to station in the forming line. Thus, proper monitoring and indexing of the position of the continuous strip of coverstock material necessarily assures proper positioning of the substrate sheetstock at each station in the forming line.

Various suitable transport means are known to the skilled of the art for advancing the continuous strip of coverstock material through the forming line. According to a preferred embodiment, the transport means for advancing the coverstock, and the substrate sheetstock laminated at spaced locations thereto, comprises a set of tenterettes, the nonwoven material being gripped by the tenterettes, a track in which the tenterettes are advanced along the forming line, and a drive means. The transfer means generally would be automated, the intermittent advancement of the coverstock being coordinated with the intervals between successive actuations of the various stations of the forming line. The particular rate of travel of the coverstock must be set in view of the physical properties of the coverstock, process requirements, and the increased cost of enhanced system capabilities. The transfer means can be driven, for example, either hydraulicly or by means of an electric motor. The drive means, obviously, must have sufficient starting torque to commence each intermittent advancement of the coverstock, and must have sufficient running torque to overcome the various drags in the system. In particular, there will be a drag load on the transport means induced by the mechanism provided to handle the supply roll of coverstock material at the lamination station end of the forming line, mentioned above. The handling mechanism for the coverstock roll must ensure proper lateral position and proper longitudinal tension on the continuous strip fed to the forming line. In a typical forming line according to the preferred embodiment, the transport means must have the capability of operating at the specified transfer rate while under a drag load of approximately 10–40 pounds. The transport means preferably can be temporarily moved with relative ease to allow access to various stations in the forming line. Thus, for example, it should be moveable to allow access to the press of the thermoforming station for easy molding tool loading and unloading. The tenterette should have the capability of being advanced or "indexed" a variable distance to provide flexibility in the design and adjustment of the forming line. Typically, for example, it should have the capability of being indexed approximately 12" to 82" plus/minus 0.25". The degree of error in the indexing should be kept relatively small, since this impacts on the ability of the transport means to precisely locate the substrate sheets at each successive station in the forming line.

As discussed above, the transport means preferably comprises a tenterette system. Preferably it further comprises a tenterette lift mechanism for adjusting the height of the coverstock strip at one or more locations along the forming line. Thus, while the coverstock typically would always be transferred at a single, preselected transfer line height, it may be desirable to raise or lower the coverstock strip at a given forming line station.

During operation of the forming line, the coverstock preferably is pulled by the tenterette system around a reverse roll and a spreader roll into the tenterette entrance, the coverstock material guiding itself into the tenterette feed section. According to the preferred embodiment of the invention, a roll of coverstock material may comprise, for example, 200 linear yards of material. Upon exhaustion of a roll of coverstock material, the tail-end thereof can be adhered, welded or otherwise attached to the leading edge of the next roll of coverstock material to continue the supply thereof to the forming line. Suitable means, for example, a hoist and guide means, can be provided for lifting and positioning each new roll of coverstock material into position at the front end of the forming line. In addition, sensors and alarm means can be provided for detecting and indicating the need to load a new roll of coverstock material, for example, a limit switch or photo eye.

According to the preferred embodiment, a substrate sheetstock loading mechanism lifts individual sheets from a pallet stack using suction cups or the like. According to one preferred arrangement, individual sheets are lifted from the stack onto the support surface of the lamination station which has been moved laterally from within the lamination station for this purpose. The platen is then moved laterally back into the lamination station for the first pre-heating step, as described above. The lower platen is then again moved laterally back past the loading station into the radiant heating oven for the second pre-heating step described above. The platen is then again moved laterally into the lamination station. After the sheet of substrate has been laminated to the coverstock, the platen is again moved laterally to the loading position. It is ready to receive a new sheet of substrate, as the first sheet, laminated to the coverstock strip, is being advanced through the forming line. Preferred heating means for the pre-heating/laminating platens include, for example, circulating hot oil, electric resistance heating, steam heating, and the like.

Following lamination of a substrate sheetstock to the continuous strip of flexible coverstock material, the coverstock is advanced by the transport means carrying the sheetstock to the next station in the forming line. Depending upon spacing between the stations, a sheet of substrate sheetstock may index out of the lamination station —or any other station in the forming line —to one or a series of more than one positions between stations. Generally, however, efficiency of time and space, it is preferable that each indexing cycle of the system bring a sheet of substrate sheetstock from one station immediately to the next station.

The thermoforming station is designed and constructed according to technology well known to those skilled in the art. The press capacity must be selected to provide adequate compression forces in view of the nature, size and thickness of the substrate sheetstock and of the contours desired in the finished product. Likewise, the molding tools used in the thermoforming process must be designed to yield the desired product. Typically, the substrate sheetstock will have cooled since leaving the lamination station, such that reheating may be required for the thermoforming operation. As in the case of the lamination station, the substrate sheetstock can be heated either prior to or during the thermoforming operation or both. Heating means described above in connection with the lamination station generally are suitable for use in the thermoforming operation, with provision being made for the temperature capability of the coverstock material. The choice of thermoforming operation also will depend upon the nature of the substrate sheetstock and in view of the desired thermoformed product. Exemplary thermoforming processes suitable for the present invention include, for example, compression molding, vacuum molding, pressure forming, etc. It may be necessary or desirable to employ one or more secondary thermoforming stations. Each such secondary thermoforming station would be associated with the requisite heating means, vacuum drawing means, etc., as may be appropriate.

It will be apparent to those skilled in the art in view of the present disclosure that various additional operations can be performed as part of the thermoforming line, and that the critical feature (and its advantages) of the present invention, the transport and precise locating of the substrate sheets by using the coverstock as a vehicle with indexed advancement through the forming line, are applicable to such additional operations. Thus, for example, following the thermoforming station there may be one or more trim stations at which the thermoformed part, still being carried by the continuous strip of coverstock material, is trimmed to provide holes, separation lines, and the like. In addition, excess substrate sheetstock material not part of the finished product can be cut away at such trim stations. In addition, one or more ornamentations can be provided in the thermoforming line, either before or after the thermoforming station, at which the laminated coverstock/substrate is modified, for example, by addition of appliques. Preferably, there is a final station to which the thermoformed part is advanced by the transport means, again still by means of advancing the continuous strip of coverstock material, at which final station the product is cut free of the strip of coverstock material. The thermoformed part can at this point be loaded, either manually or automatically, for shipment or further processing.

Numerous modifications and alternative embodiments of the above-described thermoforming line are possible without departing from the scope of the invention. According to one such alternative embodiment, one or more additional materials is added to the laminate. Thus, for example, cotton shodding can be positioned between the coverstock and the substrate sheetstock to provide contour, cushion, sound insulation, etc. Similarly, urethane foam can be added. Such padding-type materials can be added, for example, by adhesive lamination to the coverstock or to the substrate sheetstock prior to lamination of the coverstock to the substrate sheetstock. Alternatively, such materials can be added by simple mechanical entrapment between the coverstock and the substrate sheetstock, provided that sufficient peripheral substrate sheetstock is exposed for lamination to the coverstock. Depending on the type of padding-material added, the means by which it is incorporated into the lamination, and the position of such material relative the coverstock and the substrate sheetstock, it may be added either before the lamination station or thereafter. Additional materials which can be added to the lamination include also, for example, an additional coverstock. Thus, for example, a sheet of coverstock can be laminated to the second side of the substrate sheetstock. Such additional coverstock can be added either in the form of discreet pieces of coverstock, sized to cover all or a portion of the second surface of the substrate sheetstock, or it can be provided in the form of a second continuous strip of coverstock material and, optionally, used in conjunction with the first strip of coverstock material to transport the lamination through the thermoforming line. Yet another material which optionally may be added to the laminate is a reinforcement material. Thus, for example, sheets of woven or nonwoven fiberglass reinforcement material can be added between the coverstock and the substrate sheetstock, or can be added to the underside of the substrate sheetstock. From the foregoing it will be obvious to those skilled in the art that multiple lamination stations may be required to form the completed lamination. Suitable conveyor belts can be employed according to techniques well known to those skilled in the art to transport the above discussed additional materials through any required preforming steps prior to incorporating same in the laminate, after which it would be moved through the thermoforming line by advancement of the coverstock material.

Having described the subject invention above, it will be apparent to the skilled in the art that the various details of the preferred and alternative embodiments need not be strictly adhered to, but that various changes and modifications of the process fall within the scope of the invention as defined by the following claims.

I claim:

1. A method of manufacturing a form-retaining laminate comprising a form-retaining thermoformable substrate and a flexible web coverstock, said method comprising:
   (A) feeding a first location of a continuous strip of said flexible web coverstock to a lamination station, said continuous strip being engaged along at least selected portions of each longitudinal edge by transport means for advancing said continuous strip longitudinally forward;
   (B) feeding a first thermoformable sheet of said form-retaining thermoformable substrate onto a support surface of said
   (C) heating said first thermoformable sheet on said support surface in a heating station followed by shuttling said support surface with said first thermoformable sheet thereon to said lamination station and positioning it beneath said first location of said continuous strip, said continuous strip being laterally wider than said thermoformable sheet, steps (A) and (B) being performed in any sequence followed by step (C);
   (D) subsequently actuating said lamination station to press said thermoformable sheet into contact with said first location of said continuous strip to laminate said thermoformable sheet to said first location;
   (E) subsequently actuating said transport means to advance said continuous strip longitudinally forward to transport said first location of said continuous strip and said thermoformable sheet laminated thereto from said lamination station to a thermoforming station and to advance a second location of said continuous strip to said lamination station;
   (F) feeding a second thermoformable sheet of said form-retaining thermoformable substrate onto said support surface of said lamination station and heating said second thermoformable sheet on said support surface in said heating station followed by shuttling said support surface with said second thermoformable sheet thereon to said lamination station and positioning it beneath said second location of said continuous strip;
   (G) actuating said thermoforming station to thermoform said first thermoformable sheet, said first location of said continuous strip remaining laminated thereto, steps (F) and (G) being performed in any sequence after step (E);
   (H) actuating said lamination station to press said second thermoformable sheet into contact with said second location of said continuous strip to laminate said second thermoformable sheet to said second location, steps (G) and (H) being performed in any sequence, step (H) being performed subsequent to step (F); and
   (I) thereafter again actuating said transport means to advance said continuous strip longitudinally forward.

2. The method of claim 1, wherein additional heating is performed in said lamination station.

3. The method of claim 1, wherein said continuous strip comprises a flexible web of nonwoven, thermoplastic fibrous material.

4. The method of claim 1, wherein said transport means comprises a set of tenterettes engaging said continuous strip of coverstock along at least selected portions of each longitudinal edge thereof.

5. The method of claim 1, wherein said transport means advances each sheet of substrate sheetstock from said lamination station immediately into said thermoforming station.

6. The method of claim 1, wherein said transport means advances each sheet of thermoformable substrate from said lamination station to at least one intermediate location at which it stops prior to advancing into the thermoforming station.

7. The method of claim 1, further comprising the steps of transporting each sheet of thermoformable substrate into a trimming station and actuating said trimming station to trim said laminate, these steps occurring subsequent to at least steps (A), (B) and (D).

8. The method of claim 7, wherein each sheet of thermoformable substrate enters said trimming station subsequent to being thermoformed in said thermoforming station.

9. The method of claim 7, wherein said trimming station cuts free said thermoformable substrate with a portion of said coverstock laminated thereto from a remaining portion of said continuous strip.

10. The method of claim 1, further comprising the incorporation of an additional material in said laminate.

11. The method of claim 10, wherein said additional material is positioned on each sheet of thermoformable substrate prior to actuation of said lamination station to act thereon, whereby said additional material is sandwiched between said substrate and said coverstock.

12. The method of claim 10, wherein said additional material comprises a second coverstock, which second coverstock is laminated to a surface of said substrate opposite that to which said continuous strip is laminated.

13. The method of claim 1, further comprising the step of transporting each sheet of thermoformable substrate to an ornamentation station and actuating said ornamentation station to modify the appearance of said laminate, these steps occurring subsequent to at least steps (A), (B), (C) and (D).

* * * * *